(12) United States Patent
Teich

(10) Patent No.: US 9,244,794 B2
(45) Date of Patent: Jan. 26, 2016

(54) MODULAR COMPUTING ARCHITECTURE ENABLING DIAGNOSTICS

(75) Inventor: Paul R. Teich, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 813 days.

(21) Appl. No.: 13/530,435

(22) Filed: Jun. 22, 2012

(65) Prior Publication Data
US 2013/0346026 A1    Dec. 26, 2013

(51) Int. Cl.
*G06F 11/10* (2006.01)
*G06F 11/273* (2006.01)
*G06F 11/30* (2006.01)

(52) U.S. Cl.
CPC .......... *G06F 11/273* (2013.01); *G06F 11/2733* (2013.01); *G06F 11/3055* (2013.01)

(58) Field of Classification Search
CPC ... G06F 11/273; G06F 11/2294; G06F 11/27; G06F 11/2733; G06F 11/2736; G06F 11/30; G06F 11/3055
USPC ........ 714/26, 25, 27, 30, 31, 37, 47.1, 48, 57; 702/183
See application file for complete search history.

(56) References Cited

U.S. PATENT DOCUMENTS

| | | | |
|---|---|---|---|
| 7,571,071 B2 * | 8/2009 | Shand | 702/122 |
| 8,792,879 B2 * | 7/2014 | Finberg | 455/425 |
| 2003/0191877 A1 * | 10/2003 | Zaudtke et al. | 710/72 |
| 2005/0240818 A1 * | 10/2005 | James et al. | 714/27 |
| 2012/0198274 A1 * | 8/2012 | Cho et al. | 714/15 |

* cited by examiner

*Primary Examiner* — Joseph D Manoskey
(74) *Attorney, Agent, or Firm* — Faegre Baker Daniels LLP

(57) ABSTRACT

A device and method for providing computer operation diagnostics. The method includes coupling a mobile device (such as a mobile smartphone) to the computer via a diagnostic port. The smartphone has a diagnostic program (application) thereon that is initiated so as to be able to communicate with a diagnostic module within the computer to request and receive information from the computer.

19 Claims, 4 Drawing Sheets

MODULAR COMPUTING ARCHITECTURE ENABLING DIAGNOSTICS

FIELD OF THE DISCLOSURE

The present disclosure is related to methods and devices for providing low cost PC diagnostics. The present disclosure is related more specifically to methods and devices for providing interfaces for mobile diagnostic devices and devices able to take advantage of the mobile diagnostic devices.

BACKGROUND

Many areas, including emerging regions often recycle and reuse computing components. This habit provides that these markets want to buy inexpensive but fully capable PC desktops. These PC desktops can be repaired and upgraded as needed due to the wide availability of repair/upgrade parts.

However, PCs are still complicated for novices to build and repair and tend to use cheap, easily damaged connectors that are not intended for many physical connect/disconnect cycles. Wires and connectors are typically marked in a single language (frequently English) when marked at all, which often presents problems for English as a second language (ESL) and non-English speakers. Further, many of the pin headers look very similar. Still further, just because a wire fits in a connector or a card fits in a socket does not ensure that the wire/card is suitable for working with the connector/socket. Overall, each interchangeable piece presents a possible point of failure. Furthermore, some failures result in the CPU being non-responsive such that any sort of self-diagnosis or reporting by the CPU is not possible.

Beyond emerging markets, knowledgeable hobbyists consider PCs easy to snap together and often a PC build boots the first time it is assembled, but if something goes wrong it is very difficult to diagnose problems.

Regardless of the geographic location, the lack of function makes remote diagnostics (such as a helpdesk, knowledgeable individual, or otherwise) difficult if not impossible.

Accordingly, there exists a need for an improved method and apparatus that permits remote diagnostics for a computer where the device providing the diagnosis is one readily available to emerging markets and can be provided at low cost.

DETAILED DESCRIPTION

In an exemplary and non-limited embodiment, aspects of the invention are embodied in a method of providing computer operation diagnostics and devices related thereto. The method includes coupling a mobile device (such as a mobile smartphone) to the computer via a diagnostic port. The smartphone has a diagnostic program (application) thereon that is initiated so as to be able to communicate with a diagnostic module within the computer to request and receive information from the computer.

Briefly, in one example, a diagnostic controller is provided that includes one or more inputs operable to receive diagnostic data from a plurality of computing components of a first computing device; a power input operable to receive power from a power supply of the first computing device, the power input operable to receive power independently of power being supplied to other computing components of the first computing device other than the power supply; and a communication port operable to send diagnostic information to a second computing device distinct from the first computing device.

In another example, a computing component is provided including: at least one transistor; the at least one transistor operable to provide identification of the computing component and operational status of the computing component; and a communication port in communication with the at least one transistor such that the communication port is operable to communicate the identification and operational status of the component.

Figure 1:
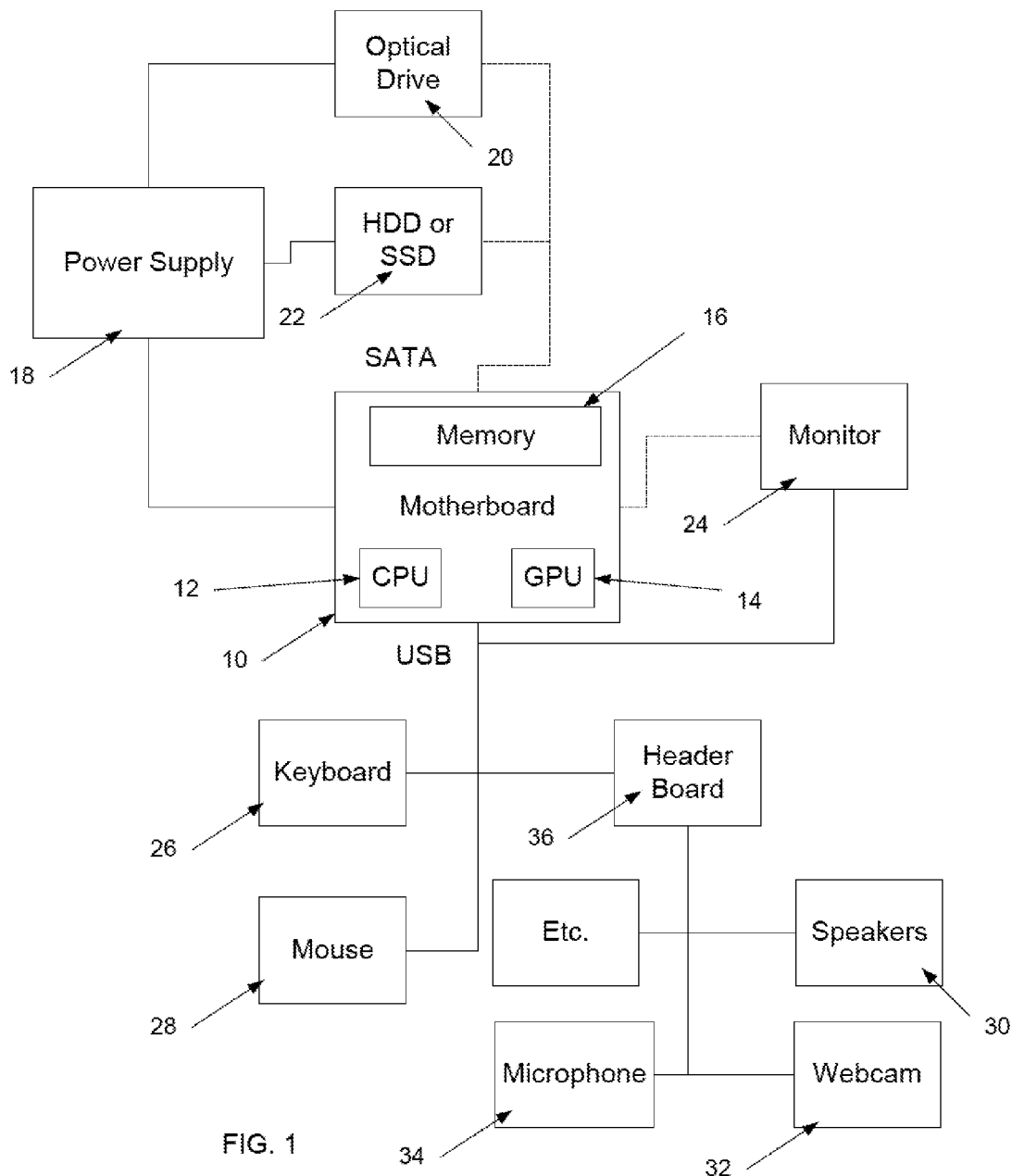
FIG. 1 is a diagram showing existing computing architecture.

FIG. 1 shows a typical PC architecture. Motherboard 10 is the central component to which other components link. Motherboard 10 is shown with onboard central processor 12, graphics processor 14, and memory 16. Power is supplied to motherboard 10 by power supply unit 18. Power supply unit 18 also supplies power to storage devices, shown as Optical drive 20 and Hard Disk Drive 22 (or Solid-State Drive). Both the optical drive 20 and HDD 22 are electrically coupled to and controlled by motherboard 10. Motherboard 10 further provides video output ports for coupling to monitor 24 and provides serial busses such as USB or SATA for coupling to various peripherals. As shown, keyboard 26 and mouse 28 directly connect via USB. Other peripherals, such as speakers 30, webcam 32, and microphone 34 connect to motherboard 10 via a panel board (header board) 36 and USB. Panel board 36 provides interfaces for the various peripherals connected thereto. Such interfaces include but are not limited to USB interfaces and mini-plugs.

Figure 2:
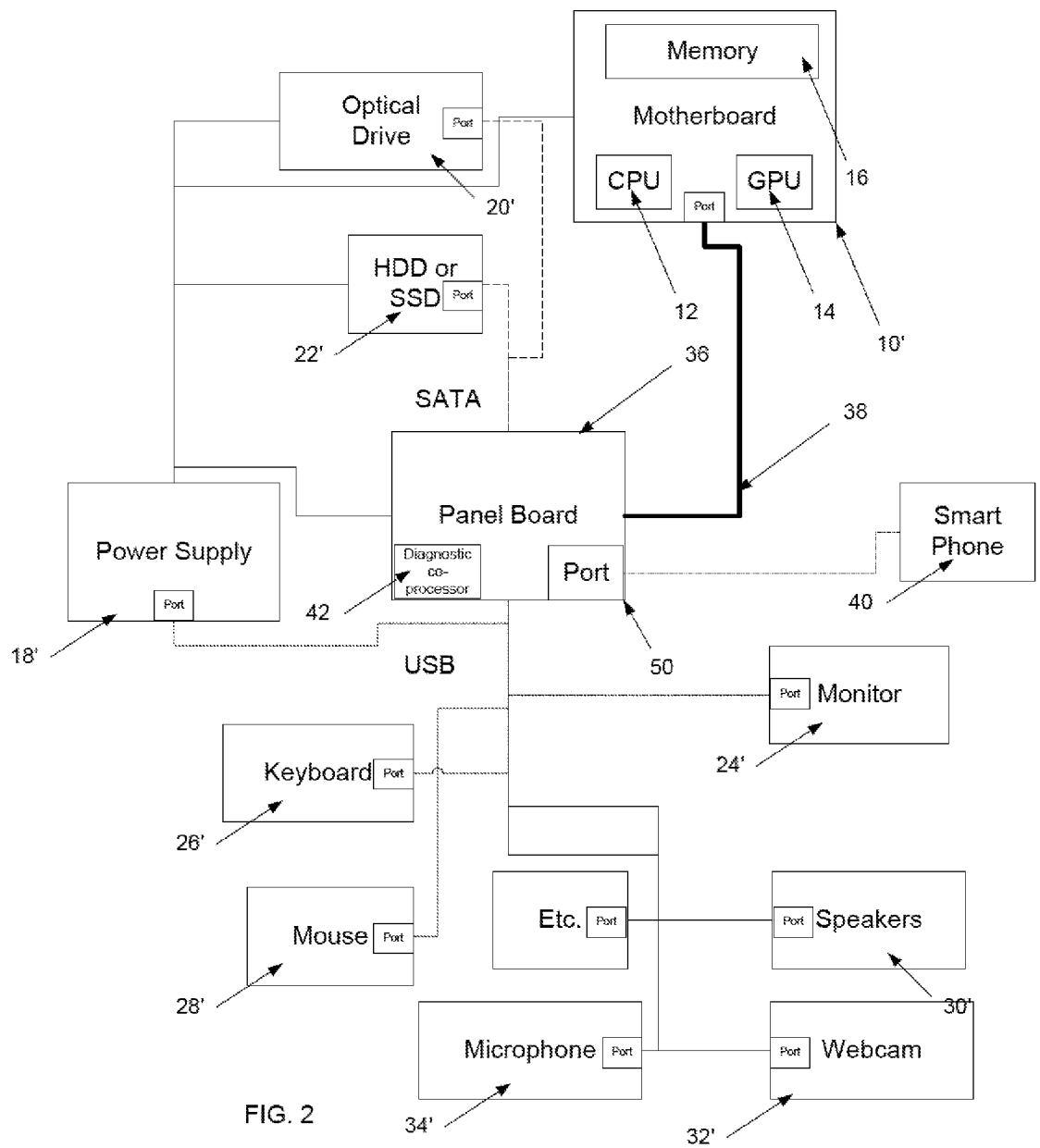
FIG. 2 is a diagram showing computing architecture employing a diagnostic panel of the present disclosure.

FIG. 2 shows a new architecture of the present disclosure. While the present disclosure is discussed with reference to a desktop-type PC, one of skill in the art would recognize that the concepts and parts could be applied to notebook and other portable computers. Indeed, the concepts can be applied to any modular electrical system with interchangeable pieces.

Panel board 36 is the central component to which other components link. Panel board 36 includes diagnostic co-processor 42. Motherboard 10 is includes onboard central processor 12, graphics processor 14, and memory 16. Motherboard 10 is of the type used in FIG. 1. As will be discussed below, one or more devices 16', 18', 20', 22', 24', 26', 28', 30', 32', 34' include reporting functionality. Motherboard 10 requires no special enhancements or alterations relative to motherboard 10 of FIG. 1. However, embodiments are envisioned where motherboard 10' having reporting functionality is used. Power is supplied to motherboard 10, 10' by power supply unit 18'. Power supply unit 18' also supplies power to storage devices, shown as Optical drive 20' and Hard Disk Drive 22' (or Solid-State Drive). Power supply unit 18' also provides power directly to panel board 36. Both the optical drive 20' and HDD 22' are electrically coupled to panel board 36. Direction for optical drive 20' and HDD 22' are relayed from motherboard 10 via panel board 36. Motherboard 10, 10' is coupled to panel board 36 via high speed cable/connector 38. Motherboard 10, 10' and/or panel board 36 provides video output ports for coupling to monitor 24. Panel board 36 provides serial busses such as USB for coupling to various peripherals. Keyboard 26', mouse 28', speakers 30', webcam 32', and microphone 34' connect to motherboard 10, 10' via a panel board 36 and USB. Panel board 36 further provides an externally accessible port 50 (which may be a USB port, or a wireless port such as Bluetooth, WiFi Direct, or other point-to-point wireless Ethernet) operable to connect smart-phone 40 thereto.

Accordingly, all components connect to panel board 36 and communicate therethrough (with exceptions in certain embodiments, such as for monitor 24). In the embodiment of FIG. 2, each device 16', 18', 20', 22', 24', 26', 28', 30', 32', 34' includes transistors therein dedicated to reporting information about the device, such as make, model, operating specification, and operational functionality. However, it should be appreciated that some devices 10, 16, 18, 20, 22, 24, 26, 28, 30, 32, 34 may not have the dedicated reporting transistors. The lack of the dedicated reporting transistors will not prevent the device from working to provide an operational system, but will make the panel board 36 unable to provide full diagnostic capabilities therefor. Devices 10', 16', 18', 20', 22', 24', 26', 28', 30', 32', 34' with reporting functionality also have communication ports (physical or wireless) for communicating with panel board 36. In one embodiment, the reporting of operational functionality can be as simple as a single bit acting providing a yes/no indication. In other embodiments, the reporting of operational functionality is more robust and providing a more detailed description of sub-systems and of any instances of less than optimal operation. By way of example, in one embodiment, power supply 18 includes ports accepting wires to transmit power to panel board 36. In this example, power supply 18 also includes a USB port operable to output the reporting information. A USB cable is attached to the USB port and also to a corresponding port on panel board 36. Thus, information about power supply 18 is communicated to panel board 36. By further way of example, reports of operational functionality and interpretation thereof may include 1) that no response from a component indicates a power failure which can be cross-checked with the status of power supply 18 or cross checked with other indicated failures and 2) error codes indicating that some operating specification is non-responsive or under-performing.

Figure 3:
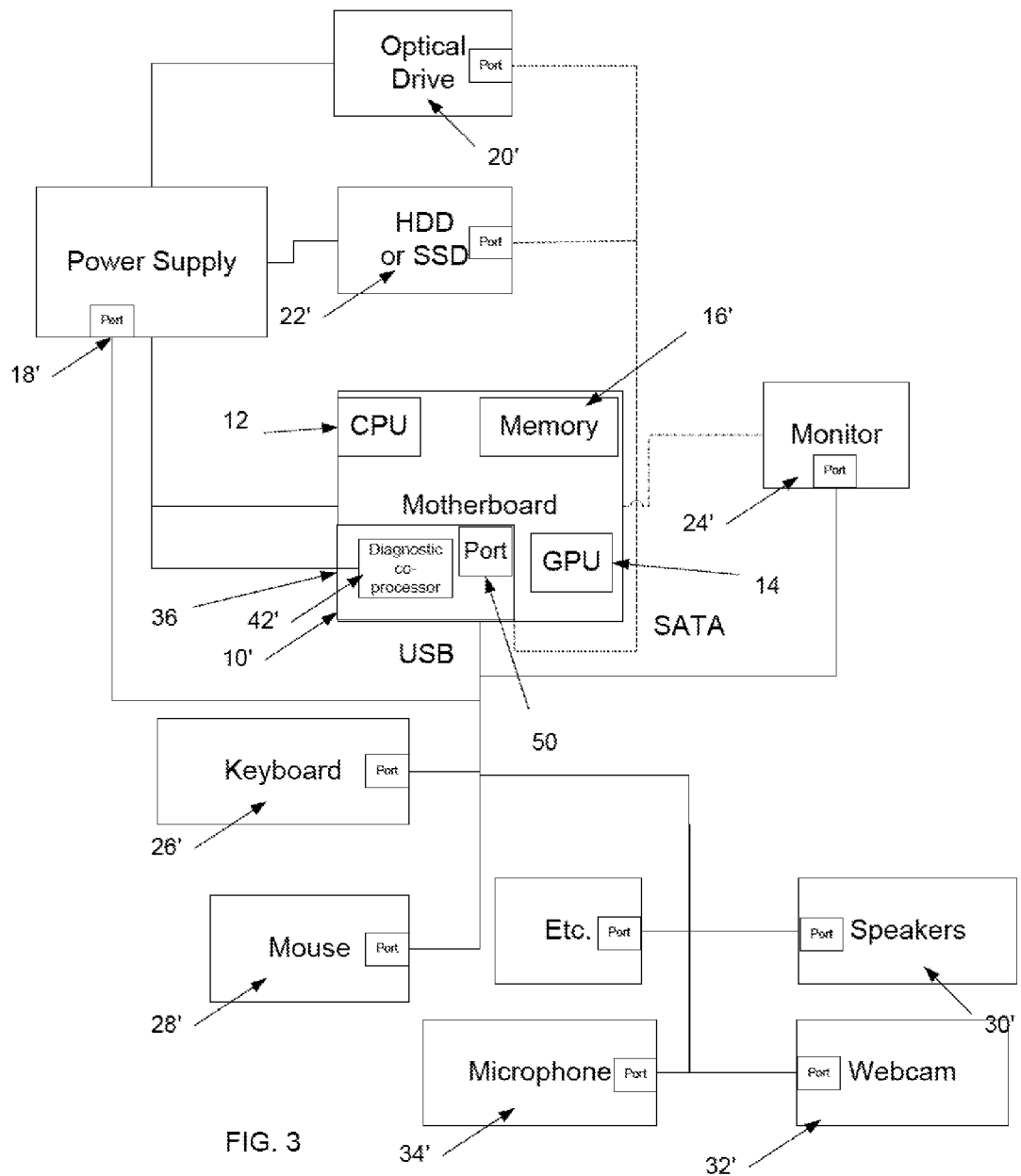
FIG. 3 is a diagram showing another embodiment computing architecture of the present disclosure.

FIG. 3 shows another embodiment where motherboard 10' is specifically designed to work with one or more devices 16', 18', 20', 22', 24', 26', 28', 30', 32', 34' having reporting functionality built therein. In such a case, the architecture can be more akin to that shown in FIG. 1. In this embodiment, functionality of panel board 36 is effectively built into motherboard 10'. However, as shown, port 50 (physical or wireless) is made available allowing an external diagnostic device to interface with an internal diagnostic device. Motherboard 10' would be expected to have heightened utility in an environment where devices with reporting functionality are plentiful and routinely encountered. Motherboard 10' includes diagnostic co-processor 42' thereon. In this embodiment, diagnostic co-processor 42' is separately powered from motherboard 10'.

Panel board 36 receives identification information and operational information from attached components. Panel board 36 synthesizes and performs diagnostics using the information via diagnostic co-processor 42. Panel board 36 further makes the information available via externally accessible port 50 (wired or wireless). As previously noted, externally accessible port 50 is operable to communicate with smart-phone 40 (or tablet, or other mobile computing platform).

Figure 4:
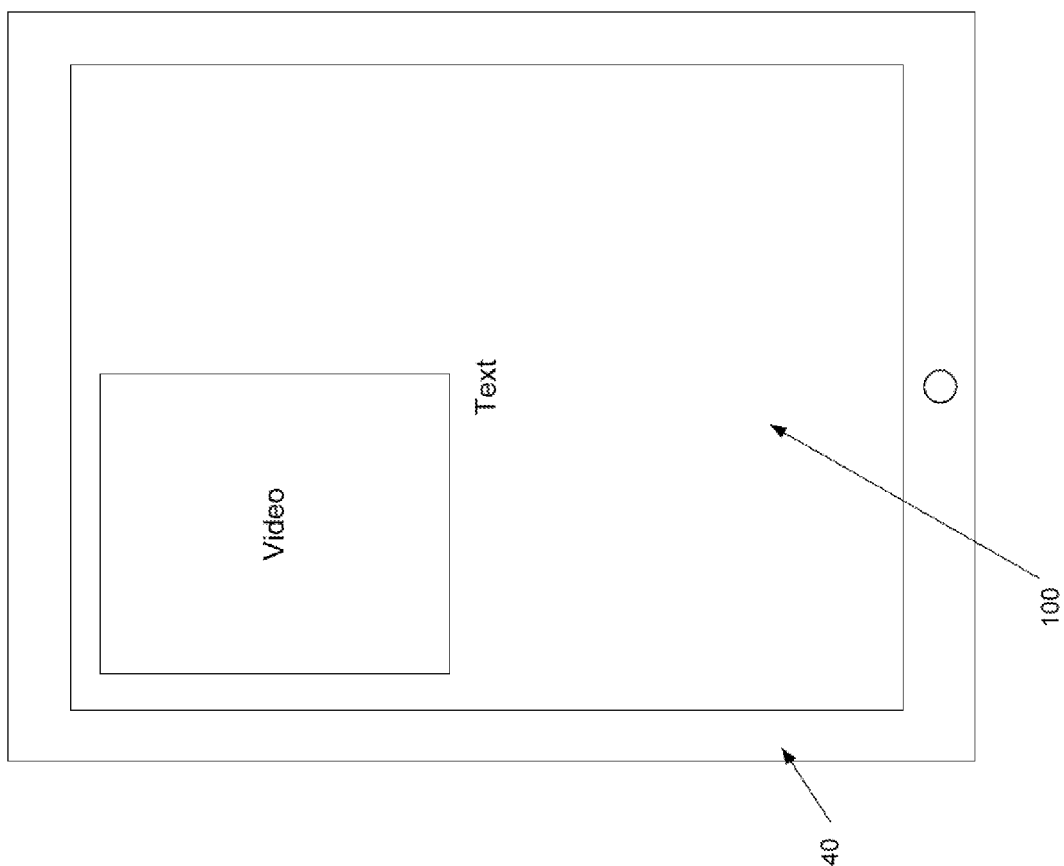
FIG. 4 is a plan view of a smartphone having diagnostic software thereon.

Smart phone 40 is provided with a diagnostic application 100, as shown in FIG. 4. The application is configured to communicate with panel board 36 (and motherboard 10') and to have access to the reported diagnostic data (ID and operational data). Application 100 provides an interface in any desired language. Application 100, either through its own diagnostic knowledge and programming or in combination with the diagnostic knowledge and programming on panel board 36, is able to synthesize the received information and provide a user with fault causes for any improper operation. Such fault causes may include but are not limited to incompatible component devices, mis-connected devices, and malfunctioning component devices. In one embodiment, application 100 provides an interactive step-by-step walkthrough for troubleshooting. Application 100 is able to initiate diagnostics on the PC and display the results on a display of smart phone 40. Application 100 further includes images and videos, as appropriate, providing instruction on what part(s) of the computer are not functioning correctly and how to fix them.

Accordingly, smart phone 40 with application 100 provides a quick, mobile, and on-site diagnostic tool operable to determine fault sources in computing devices that have modular parts that present multiple potential fault sources. Additionally, the data is presented in a chosen language of the user.

In another embodiment, the diagnostic data is made available across a network. In such an embodiment, the network adapter serves as a diagnostic port. Software or firmware is provided access to the diagnostic data and also provided with access to a network communication module. A helpdesk or other diagnostic professional is then able to query panel board 36. By using the reporting construct above, the diagnostic information can be provided to the diagnostic professional is a standardized way.

Additionally, in that panel board 36 is powered directly from power source 18 and directly accessible by smart phone 40, (and in that the devices 16', 18', 20', 22', 24', 26', 28', 30', 32', 34' are directly connected to panel board 36) operation of the diagnostic portions of the PC are not dependent upon a functional motherboard 10, 10'. It should be appreciated that embodiments are envisioned where panel board 36 is actually multiple panel boards 36 in communication with each other.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of providing diagnostic services for a computing device including:
    coupling a mobile device with a diagnostic program thereon to a diagnostic port of the computing device having a first computing component, the first computing component having at least one reporting transistor dedicated to reporting diagnostic information regarding the computing component, the diagnostic information including first diagnostic information selected from the group including the identity and operational status of the component;
    initiating the diagnostic program on the mobile device;
    issuing a query of a diagnostic information source within the computing device; and
    receiving the first diagnostic information from the diagnostic information source.

2. The method of claim 1, wherein coupling the mobile device to the diagnostic port includes creation of a wireless link between the mobile device and the computing device.

3. The method of claim 1, wherein the mobile device is a smart-phone and initiating the diagnostic program includes activating an application on the smart-phone.

4. The method of claim 1, wherein the diagnostic port is part of a circuit that receives identification information and operational information directly from one or more of a keyboard, a mouse, a webcam, a microphone, a monitor, a power supply, a motherboard, and a disk drive.

5. The method of claim 1, wherein the diagnostic port of the computing device is in communication with a diagnostic device within the computing device.

6. The method of claim 5, wherein the diagnostic device within the computing device is coupled to at least one computing component, the diagnostic device receiving at least one of identification information and operational information from the at least one computing component.

7. A diagnostic controller including:
    one or more inputs operable to receive diagnostic data from a plurality of computing components of a first computing device, the plurality of computing components including a first computing component having at least one reporting transistor dedicated to reporting diagnostic information regarding the first computing component, the diagnostic information including first diagnostic information selected from the group including the identity and operational status of the component;
    a power input operable to receive power from a power supply of the first computing device, the power input operable to receive power independently of power being supplied to other computing components of the first computing device other than the power supply; and
    a communication port operable to send diagnostic information to a second computing device distinct from the first computing device.

8. The device of claim 7, wherein the diagnostic port is disposed in a panel board of the first computing device.

9. The device of claim 8, wherein the panel board is located within a housing of the first computing device.

10. The device of claim 7, wherein the diagnostic port includes an interface for receiving a connection wire, the interface being disposed on an external surface of the first computing device.

11. The device of claim 7, further including a communications bus between the diagnostic controller and a motherboard of the first computing device.

12. A diagnostic controller including:
    one or more inputs operable to receive diagnostic data from a plurality of computing components of a first computing device;
    a power input operable to receive power from a power supply of the first computing device, the power input operable to receive power independently of power being supplied to other computing components of the first computing device other than the power supply;
    a communication port operable to send diagnostic information to a second computing device distinct from the first computing device; and
    data paths allowing data to travel from the computing components to a motherboard, the data paths including the diagnostic controller.

13. The device of claim 12, wherein data output from the computing components must travel through the diagnostic controller to reach the motherboard.

14. A computing component including:
    at least one transistor; the at least one transistor dedicated to providing one or both of identification of the computing component and operational status of the computing component; and
    a communication port in communication with the at least one transistor such that the communication port is operable to communicate the identification and operational status of the component.

15. The computing component of claim 14, wherein the computing component is a power supply.

16. The computing component of claim 14, wherein the computing component is a hard drive.

17. The computing component of claim 14, wherein the computing component is a display device.

18. The computing component of claim 14, wherein the computing component is part of a first computing device and is operable to report operation and identification of the computing component to a second external computing device.

19. A non-transitory computer readable media having instructions thereon that when interpreted by a processor cause the processor to:
    initiate a diagnostic program on a mobile device;
    issue a query of a diagnostic information source within a computing device having a first computing component, the first computing component having at least one reporting transistor dedicated to reporting diagnostic information regarding the computing component, the diagnostic information including first diagnostic information selected from the group including the identity and operational status of the component; and
    receive diagnostic information from the diagnostic information source.

* * * * *